Feb. 21, 1961    A. LERBS    2,972,701
VELOCITY MODULATION TUBES
Original Filed May 5, 1955    15 Sheets-Sheet 1
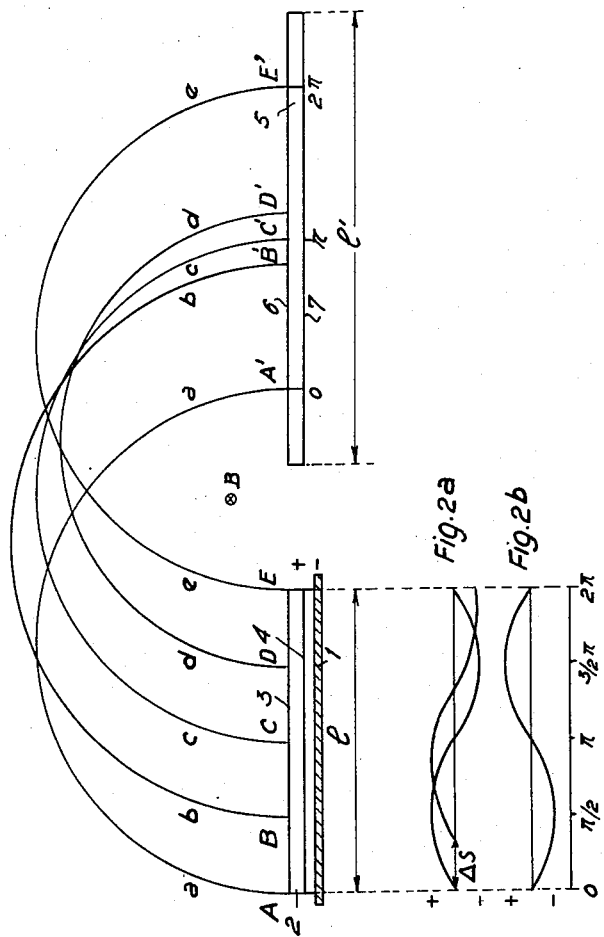
INVENTOR
Alfred LERBS
BY
ATTORNEY

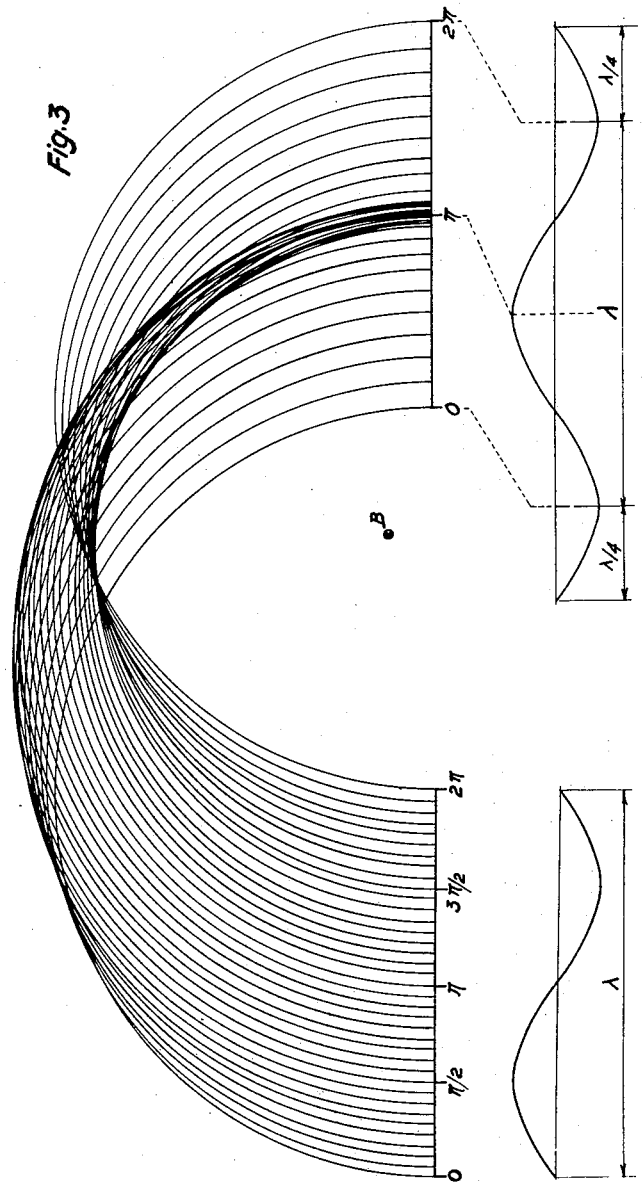

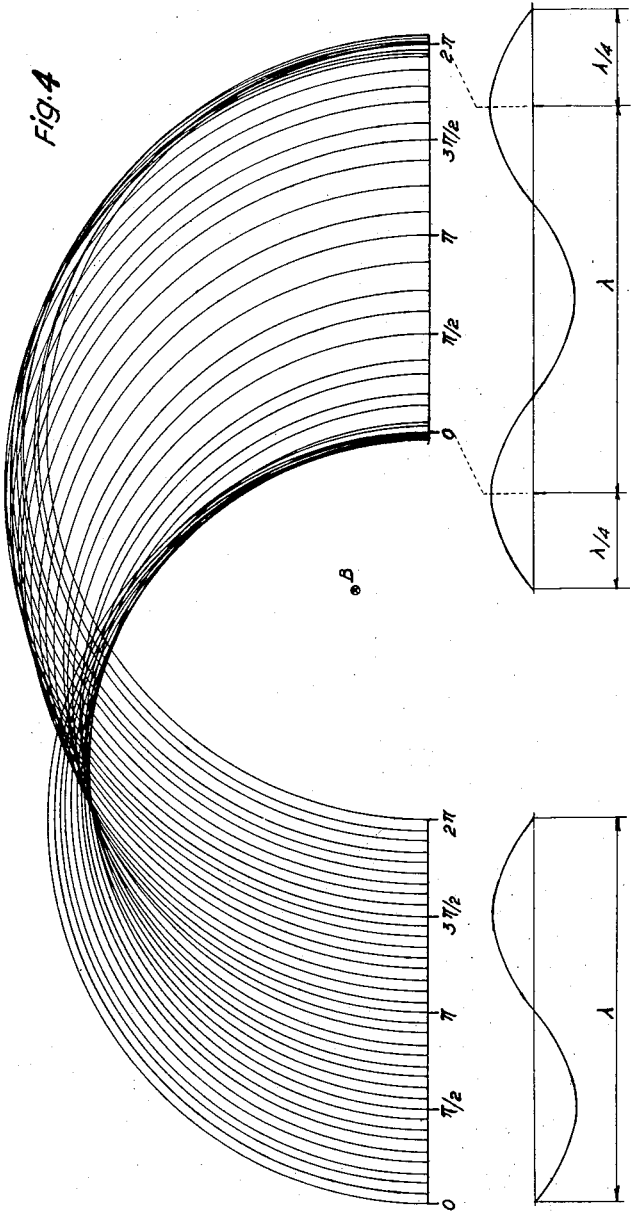

INVENTOR
Alfred LERBS

INVENTOR
Alfred LERBS

Feb. 21, 1961   A. LERBS   2,972,701
VELOCITY MODULATION TUBES
Original Filed May 5, 1955   15 Sheets-Sheet 7
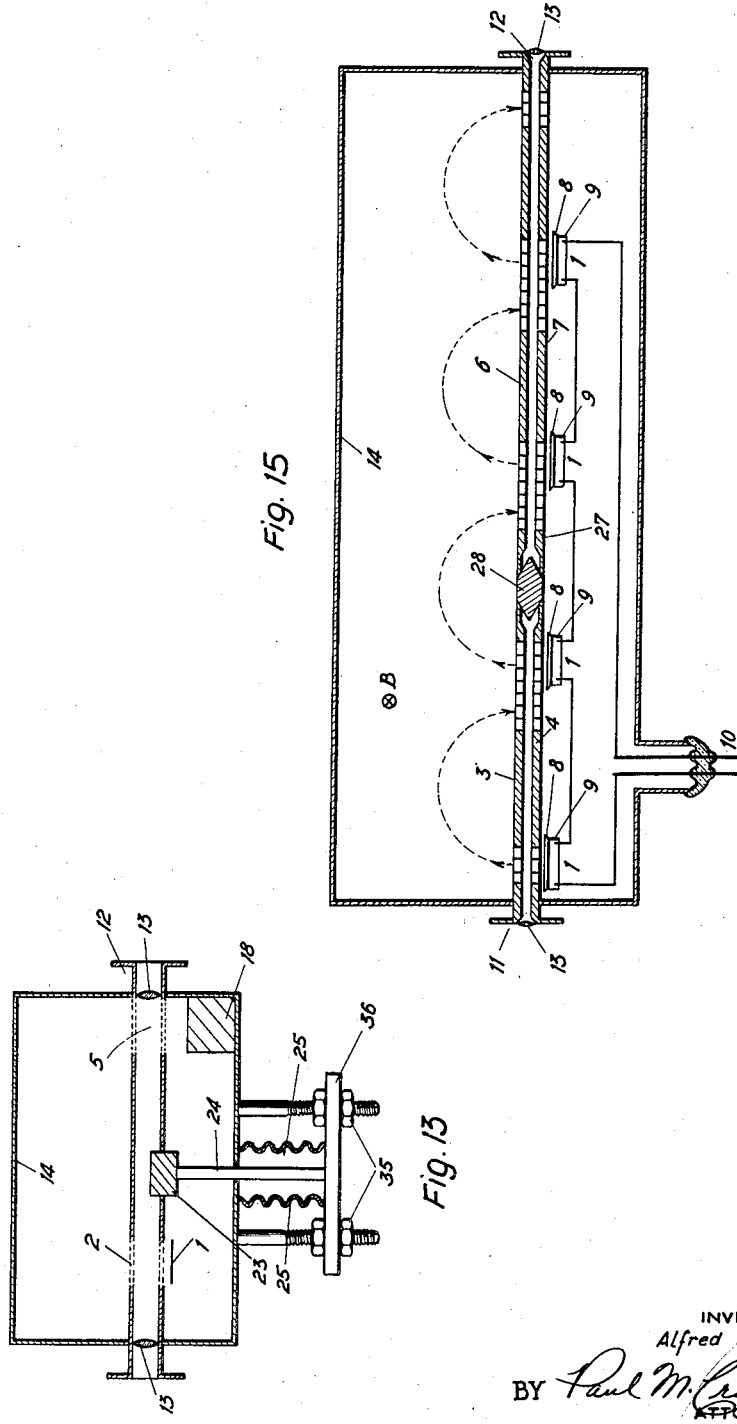

Feb. 21, 1961 A. LERBS 2,972,701
VELOCITY MODULATION TUBES
Original Filed May 5, 1955 15 Sheets-Sheet 8

INVENTOR
Alfred LERBS
BY
ATTORNEY

Feb. 21, 1961            A. LERBS            2,972,701

VELOCITY MODULATION TUBES

Original Filed May 5, 1955            15 Sheets-Sheet 9

INVENTOR
Alfred LERBS

BY *Paul M. Craig Jr.*
ATTORNEY

Feb. 21, 1961 A. LERBS 2,972,701
VELOCITY MODULATION TUBES
Original Filed May 5, 1955 15 Sheets-Sheet 10

INVENTOR
Alfred LERBS
BY Paul M. Craig, Jr.
ATTORNEY

INVENTOR
Alfred LERBS

United States Patent Office 2,972,701
Patented Feb. 21, 1961

2,972,701
VELOCITY MODULATION TUBES

Alfred Lerbs, Paris, France, assignor to Compagnie Generale de Telegraphie Sans Fil, a corporation of France Original application May 5, 1955, Ser. No. 506,317, now Patent No. 2,938,139, dated May 24, 1960. Divided and this application July 6, 1959, Ser. No. 829,174

Claims priority, application France May 10, 1954

31 Claims. (Cl. 315—5.27)

The present invention relates to velocity modulation electron discharge tubes.

In known tubes of this type, the velocity of the electron beam is modulated in a first circuit whereby the electrons become bunched. This bunching produces a high-frequency field in a second circuit to which the electrons give up their energy. This conversion of velocity modulation into density modulation occurs along the beam; the density of the electrons is uniform in each transverse section of the beam; such a density modulation is termed longitudinal modulation.

The operation of tubes based on this principle and constructed for millimeter wavelengths is not very satisfactory from the point of view of efficiency and useful power. One of the main reasons for this resides in the necessity of giving the beam and in consequence the cathode negligible transverse dimensions relative to the wavelength, thus making it impossible to use intense beam currents. Further, the dimensions of the various elements of the tube become so small that it is difficult to obtain sufficient precision in construction.

The present invention has for its object to provide tubes which are adapted to operate within the aforementioned frequency range and are exempt from these disadvantages, in that they enable the use of cathodes whose transverse dimensions are of the same magnitude order as the wavelength.

In the tubes embodying the invention, the electron beam is velocity modulated by an ultra-high frequency field in a modulating space. At the end of a certain path, the conversion of velocity modulation into density modulation is effected. According to the invention, this modulation in density is transversal with respect to the electron beam. In other words, each transverse section of the beam comprises areas where the electron density is stronger than the mean density of the beam and areas where this density is weaker. On the other hand, the mean electron density of successive transverse sections is substantially the same.

The tubes according to the invention comprise another space, said collecting space, in which the transverse density modulation of the beam induces another ultra-high frequency field; the dimensions of the cathode, and of both modulating and collecting spaces, are of the magnitude order of the wavelength to be produced.

The invention will be better understood with reference to the accompanying figures in which:

Fig. 1 is a simplified view of significant elements of the tube embodying the invention seen in longitudinal section, the operation of which is explained with reference to the diagrams shown in Figs. 2a, 2b, 3 and 4;

Figs. 11 to 13 are longitudinal views of embodiments of oscillators according to the invention with adjusting means for the oscillation frequency;

Fig. 15 is a view in longitudinal section of an amplifier according to the invention in which the modulating ultra-high frequency field is travelling;

Figure 5:
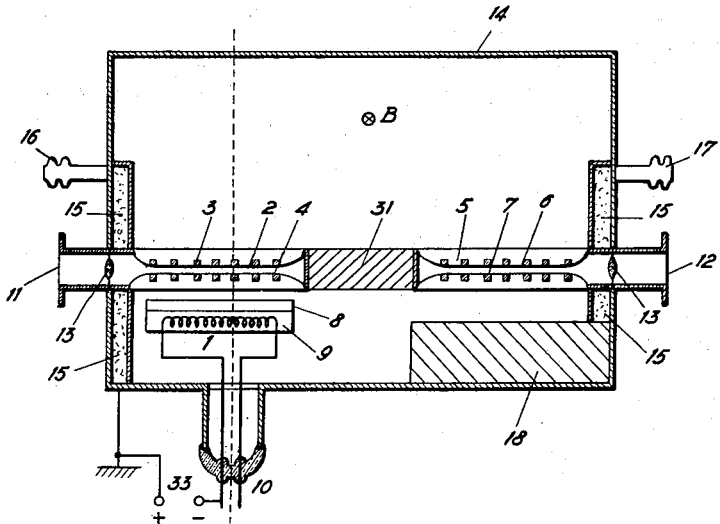
Figs. 5 and 6 are respectively views of an amplifier seen in longitudinal and transverse sections, embodying the invention.

In Fig. 1, a flat emitting cathode 1 is seen in longitudinal section. Disposed in front of this cathode and parallel thereto are two flat grids 3 and 4. Two other flat and parallel grids 7 and 6 are respectively disposed in the planes of the grids 4 and 3. A uniform magnetic induction field B is oriented in a direction perpendicular to the plane of the figure. These four electrodes are brought to a positive potential V relative to the cathode 1. An ultra-high frequency field is set up by any suitable means, in the space 2 between the grids 3 and 4 in a direction perpendicular to these two electrodes, and it is desired to establish, in the space 5 between electrodes 6 and 7, another ultra-high frequency field, said ultra-high frequency field being induced in the space 5 by the transversely modulated beam.

In the ensuing description, for the sake of simplification, it will be supposed that the electrodes 3 and 4 are at such distance from the cathode 1 that the effect the field B had on the electrons in the space between the electrodes 1 and 4 may be neglected and that, in other words, the electrons emitted by the cathode 1 traverse the space 2 in a direction perpendicular to the grids 3 and 4.

In Figure 1 the cathode is seen in longitudinal section and its length $l$ is substantially equal to the wavelength in the free space of the ultra-high frequency field set up in the space 2. It will also be supposed, firstly, that the ultra-high frequency field is standing in the space 2 and that two nodes are established at the two ends A and E of the cathode, an intermediate node being situated mid-way between these two nodes.

This unit operates in the following manner:

According to the foregoing hypothesis, the electrons emitted by the cathode 1 traverse the space 2 in a direction perpendicular to the electrodes 3 and 4. The mean velocity of all the electrons at the output end of the modulating space 2 is governed by the potential V, but some of these electrons are retarded and others accelerated by the modulating field in accordance with the well-known phenomenon of velocity modulation by an ultra-high frequency field.

The electron trajectories or paths are thereafter incurved in the drift space between the electrodes 3—4 and 7—6 as a result of the action of the field B and assume the form of arcs of circles. After having travelled along a semi-circle whose radius is proportional to their initial velocity at the outlet end of the space 2, the electrons attain the space 5 between the electrodes 6 and 7. Now, it is well known that the time taken by the electrons in travelling along a semi-circle in a space in which a uniform magnetic field prevails, is constant and is independent of their initial velocity, in this space, the angular velocity along this semi-circle, depending only on the intensity of the field; the initial velocity has determined the radius of said semi-circle.

Thus the electrons emitted at the same instant $t$ by the cathode 1 reach the space 5 at the same time. Assuming that $a, b, c, d$ and $e$ are the semi-circles travelled through by the electrons emitted respectively by the cathode in front of the nodes A, C, E and of the antinodes B and D, of the ultra-high frequency field on the cathode, it is obvious that the radius of the circles $a, c$ and $e$ is constant with respect to time, the action of the high-frequency field having no effect on the corresponding electrons.

If the configuration of the ultra-high frequency field along the cathode is as seen in Fig. $2_a$ at a time $t$ (maximum positive amplitude at the antinode B, and maximum negative amplitude at the antinode D) the circle $b$ would have maximum radius, the electron emitted at B having been subjected to the greatest acceleration of the part of the ultra-high frequency field. Similarly, the circle $d$ would have minimum radius, the electrons emitted at D having been subjected to maximum deceleration by the ultra-high frequency field. T being the period of variation of the ultra-high frequency field, at the time $$t+\frac{T}{2}$$

the configuration of the field is as plotted Fig. $2_b$.

It is obvious that in the course of one total period of variation of the field, the circles $a, c$ and $e$ maintain a constant radius, the circles $b$ and $d$ having a radius which varies in accordance with a sinusoidal time law from a maximum to a minimum.

If at the time $t$, the field has the configuration shown in Fig. $2_a$, the semi-circle $b$ has a maximum radius, the semi-circle $d$ minimum radius, and the ends of the corresponding trajectories B', D' are displaced nearer to the end C', of the semi-circle $c$.

It is clear, therefore, that in the vicinity of point C' there is a region of maximum electron density at time $t+\theta$, $\theta$ being the constant time taken by the electrons in travelling from the space 2 to the space 5.

In the foregoing description, it was implied that the ultra-high frequency field was nil at the nodes, or, in other words, that the field was perfectly standing. It is clear that if this hypothesis is not actually fully realized, the phenomena would be qualitatively the same.

Figs. 3 and 4 show the network of electron trajectories at the two successive instants $t$ and $$t+\frac{T}{2}$$

corresponding to maximum amplitude of the ultra-high frequency field at the antinodes, T being the period of the ultra-high frequency field. From Fig. 3, it is clear that in the vicinity of the end C' of the semi-circle $c$ there is a maximum electron density and a minimum in the vicinity of the ends A' and E'. In Fig. 4, it can be seen that in the vicinity of the ends A' and E' respectively, of the circles $a$ and $e$, there are maximum densities, and a minimum in the vicinity of C'. At the time $$t+\frac{T}{2}$$

the density is uniform, the ultra-high frequency modulating field being overall nil, and having no action over the electrons.

Therefore it can be understood that the density has a maximum variation during a period of the modulating ultra-high frequency field in the vicinity of A', C' and E'.

Thus there is established in the space 5 by means of induction, another ultra-high frequency field termed a collecting field which is standing and of which the respective antinodes are A', C' and E'.

Figure 6:
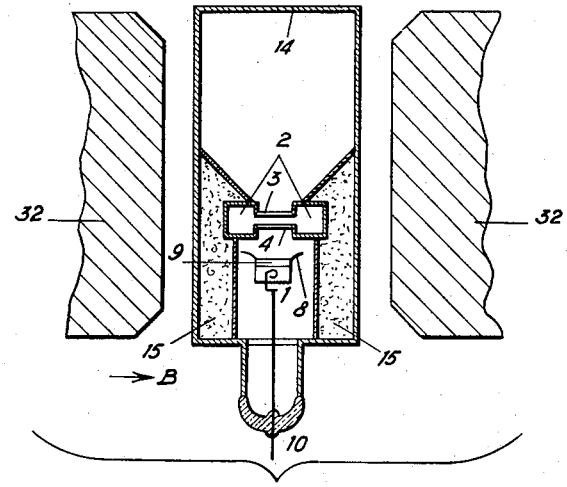

A first embodiment of an amplifying tube of the invention is shown in longitudinal sectional and cross sectional views, respectively, in Figs. 5 and 6. In these figures the same reference numerals designate the same elements shown in Fig. 1.

The tube comprises in an evacuated metal envelope 14 a cathode 1 having a filament 9 fed by conductors 10. An electron lens 8 focuses the electronic emission in a direction perpendicular to the cathode. The space 2 and its two grids 3 and 4, hereinafter termed the modulating circuit, are disposed just about the cathode. The space 5, where the amplified energy is received, is disposed in such manner that the grids 5 and 6 are respectively in the planes of the grids 3 and 4. These two circuits are separated by the electrode 31. A collector 18 captures the electrons. A source of direct current voltage 33 has its negative terminal connected to earth and, furthermore, to the unit 2, 5, 14, 18 and 31.

The envelope 14 is disposed between two polar pieces 32 (Fig. 6) which create a magnetic field B in the envelope which is perpendicular to the plane of the Fig. 5. A water jacket 15 comprising an inlet 16 and an outlet 17 serves to cool the unit.

A section of a wave guide 11 coupled to an ultra-high frequency source not shown, terminates in space 2. Likewise, the circuit 5 is coupled to an output 12. Windows 13 render the envelope vacuum tight.

Figure 7:
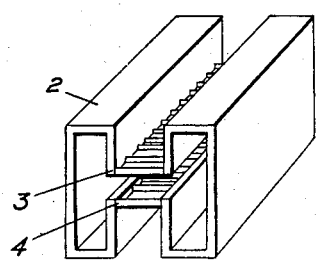
Fig. 7 is a perspective view of a detail of the tube of Figs. 5 and 6.

Fig. 7 shows, in perspective, the circuit 2. The latter has the shape of a prism made of metal comprising a reentrant portion. This reentrant portion is closed by the electrodes 3 and 4 in the form of grids. The circuit 5 not shown has an identical shape.

The operation of this unit is obvious from the foregoing description. The wavelength of the operating frequency is governed by the longitudinal dimension of the circuit 2. The length of the electrode 31 is selected in accordance with the field B and the applied potentials, in such a manner that all the electrons crossing the space 2 impinge the collector 18, after passing through space 5. These factors determine the radii of the circles $a, c$ and $e$ by well known methods.

The circuit 2 is closed by a short-circuit 31. A standing electromagnetic field is established therein. If the length of the circuit is appropriate, this field will oscillate and a field node will be established at the two ends.

Likewise, in the circuit 5, a node will be established at the end 31. But it is clear from the foregoing description that if the circuit 2 vibrates with the nodes facing the two ends of the cathodes, the circuit 5 vibrates with the antinodes situated at the limits of the impacts of the electrons.

Figure 8:
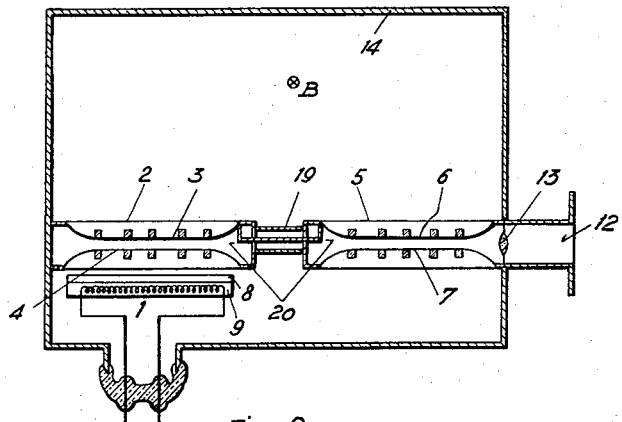
Figs. 8 and 9 are respectively plane and sectional views of an oscillator embodying the invention.
Figure 9:
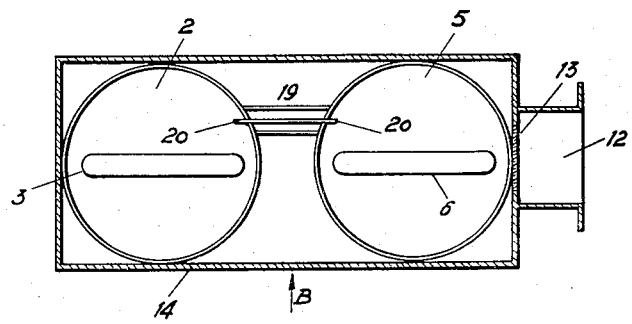
Figure 10A:
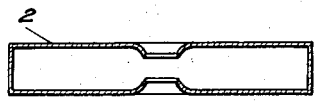
Figs. 10a and 10b are plane and sectional views of a detail of the tube of Fig. 9.
Figure 10B:
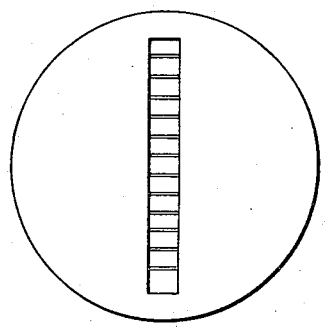

Figs. 8 and 9 show in longitudinal sectional and horizontal cross-sectional views, respectively, a self-oscillating tube embodying the invention. The circuits 2 and 5 are two cavities shown respectively in cross-section and plan in Fig. 10. Like reference numerals designate like elements in Figs. 5 and 7. A coupling between the cavities 2 and 5 is established by means of a coaxial line 19 which terminates at each end in a coupling loop 20. This coupling creates a feedback between the spaces 2 and 5. The tube comprises a single ultra-high frequency output 12 in the form of a guide. The frequency of the oscillations may be adjusted by means of slightly deforming the circuits 2 and 5 by conventional means.

Figure 11:
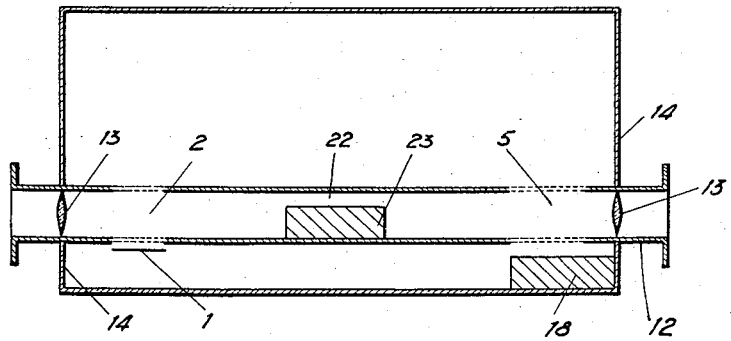
Figure 12:
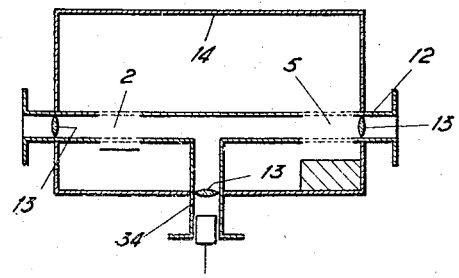

Figs. 11 to 13 diagrammatically illustrate some oscillators embodying the invention.

In Fig. 11 the circuits 2 and 5, which are in the form of two portions of a rectangular wave-guide having the same cross-section, are connected by a wave guide 22 having a smaller cross-section. This guide 22 couples the spaces 2 and 5 to each other and creates the feedback necessary for sustaining oscillations. In practice, the guide 22 is obtained by means of a block 23 disposed between the portions of guides 2 and 5. The length and the height of this block govern the phase and amplitude of the feedback. The energy is obtained at the output 12 of the guide 2—5.

In Fig. 12 there is also provided, in derivation with the guides 2 and 5, a guide portion 34 which emerges from the tube. A window 13 disposed in wave portion 34, renders the tube vacuum tight. A piston disposed in the part of the guide 34 outside the tube allows the adjustment of the feedback.

The tube shown in Fig. 13 is similar to that shown in Fig. 11 but the position of the block 23 is adjustable by means of a mechanical system comprising a rod 24 which is slidable inside a bellows 25. In tightening the nuts 35, pressure is brought to bear on the plate 36 and the rod 24, rigid with the block 23, is displaced which permits adjustment of the feedback.

Figure 14:
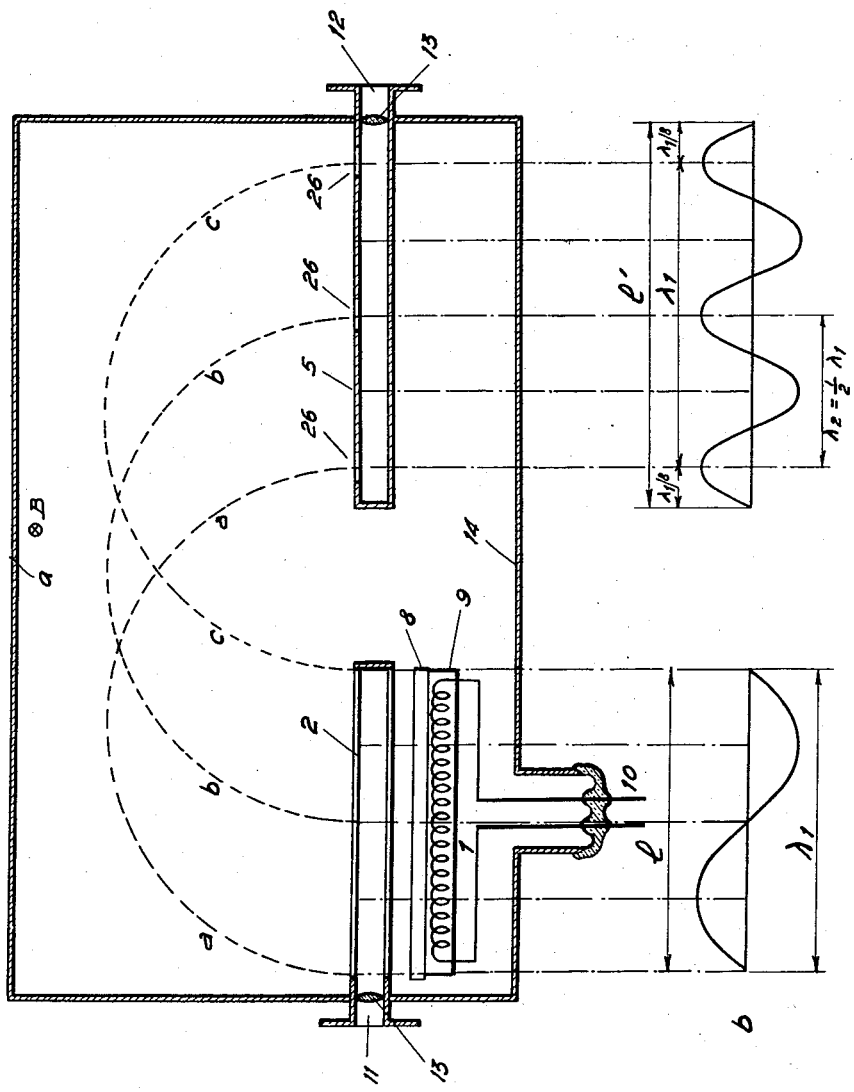
Fig. 14 is a view in longitudinal section of an embodiment of a frequency multiplier.

The tubes embodying the invention are also applicable to frequency multiplication. Fig. 14 shows merely by way of example a frequency doubler. It differs from the amplifier shown in Fig. 5 only in respect of the circuit 5 which, instead of permitting a free passage with respect to the electrons over its entire surface, comprises apertures 26 permitting such passage in certain regions while preventing it in other regions. The length of this space is equal to $1.25\lambda$, $\lambda$ being the wavelength of the operating frequency. The apertures 26 are disposed at distances from the left end of the circuit 5 which are respectively equal to $\lambda/8$, $\lambda/8+\lambda/2$ and $\lambda/8+\lambda$.

The left end of the circuit 5 is short-circuited and an ultra-high frequency node is established. 3 antinodes are establishhed in front of the apertures 26. Thus a standing ultra-high frequency field is established as indicated at the base of the figure.

It will now be supposed that the modulating ultra-high frequency field instead of being standing is traveling. Referring to Fig. 1, it can be seen that at the instant $t$, the field is distributed along the cathode in the manner shown in Fig. 2a. At this instant, the density bunching is obtained in the same manner as in the case of the standing field. At instant $t+\Delta t$, this field pattern is displaced towards the right, for example, of a length $\Delta S$ which is equal to $v\Delta t$, $v$ being the velocity of the travelling field. In the collector circuit the maxima of the field are displaced in the same manner and at the same velocity $v$ as the maxima of the modulating field. Thus a travelling field is established on condition that the collector circuit is closed on its wave impedance and that, furthermore, the field is capable of being propagated at the velocity $v$. Hence it is necessary that the ultra-high frequency parameters of the two circuits be identical.

Fig. 15 shows an amplifier in which the modulating field is travelling. This tube on the whole comprises substantially the same elements as the tube shown in Fig. 5 which carries the same reference characters. It comprises a very long guide 27 to which a travelling wave is fed at 11, along this guide there being disposed several identical cathodes 1 which are separated by a distance which is a whole number multiple of $\lambda c$, $\lambda c$ being the wavelength in the guide of the travelling field. Further, the field B is so selected that the electrons emitted from one cathode strike the homologous point of the following cathode, in the absence of the ultra-high frequency field.

As it travels, the wave velocity modulates the beam emitted by the first cathode starting from the left, as seen in the figure, then is amplified by interaction with the same beam which is density modulated transversely at the end of its semi-circular trajectory. The amplified wave therefore gives to the beam of the second cathode a deeper velocity modulation. Finally, there is received at 12 a wave which has undergone several successive amplifications. In order to reduce the risk of self-oscillations, a localized attenuation 28 is disposed in the guide 27 between two cathodes 1. The respective dimensions of the circuits are so selected as to avoid harmful electron impacts.

Figure 16:
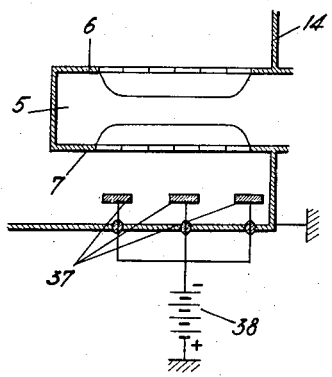
Figs. 16 and 17 are views in longitudinal section of subsequent improvements in the circuits utilized.

In Fig. 16, plates 37 have been disposed in such manner as to receive the electrons that have traversed the induced ultra-high frequency field. The source of voltage 38 brings them to the same direct current potential less than that of the circuit 5. They are preferably disposed in front of the voltage nodes in the circuit 5. The electrons that traverse the circuit 5 in the vicinity of these nodes have not given up much energy to the ultra-high frequency field and have not in consequence lost kinetic energy. Thus, it is advantageous to retard them so as to lose as little energy as possible at the moment of their capture.

Figure 17:
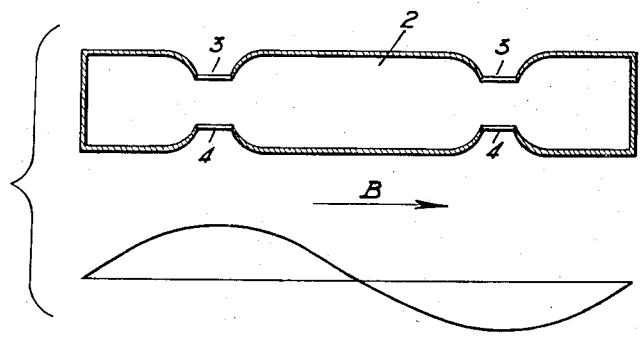

It is possible to design tubes embodying the invention with cathodes and circuits having, in the direction perpendicular to the plane of the Figs. 1, 5 and 8, a dimension of the order of the operational wavelength. Fig. 17 shows a sectional view, taken on a plane parallel to the lines of force of the magnetic field, i.e. on a plane perpendicular to the plane of Fig. 5, of a space or circuit 2 employed in these tubes. There may be seen in this figure several systems of electrodes 3—4, excitation also being possible in a standing high-frequency wave mode. The grids 3—4 are disposed in front of the antinodes of the exciting wave, since no advantage is gained if the electrons pass through the regions of the nodes where little energy is given up or received by them. The circuit 5 (not shown) is identical to the circuit 2.

In the foregoing, cathode 1, electrodes 3 and 4 were supposed to be at such distance that the time taken by the electrons in transit was constant and independent in particular of their initial velocity in the space without electric field and electromagnetic field.

It is, however, difficult to construct tubes, having cathode, and accelerating electrodes, i.e., grids 3 and 4 in very close proximity. The potential V can be of the order of 1000 v. relating to the cathode and breakdowns can occur.

In the ensuing description, the case in which the cathode 1 and the electrodes 3 and 4 are sufficiently spaced apart for avoiding such breakdowns, and located in such manner that it is no longer possible to neglect the action of the magnetic field B on the electrons travelling between the electrodes 1 and 4, is examined.

Electrons emitted by the cathode 1 are in this case subjected in the space 2 to the joint action of the high-frequency field and the field B and enter the drift space, between electrodes 3—4 and 6—7, the angles between the respective trajectories and electrodes 3 depending on the phase of the modulating field at the instant of emission and of the emission point of the cathode. Actually, the direction of electron trajectories is no more normal to electrodes 3 and 4 and parallel to the lines of force of the ultra-high frequency field. The trajectories in this space are no longer semi-circles, the arcs travelled along depending on the phase of the high-frequency field, and the transit time is no longer constant. It may be shown that the transit time varies, between an upper and a lower limit, about a mean value i.e. is modulated.

Theory and experience show that, for the tube according to the invention to operate correctly, the transit time between the electrodes 2 and 5 has to be the same for all the electrons.

It may also be demonstrated that for certain difference values between the respective transit times of the electrons, the resulting bunching is such that the tube operates substantially as described above. These values may be determined by experiment.

Figure 18:
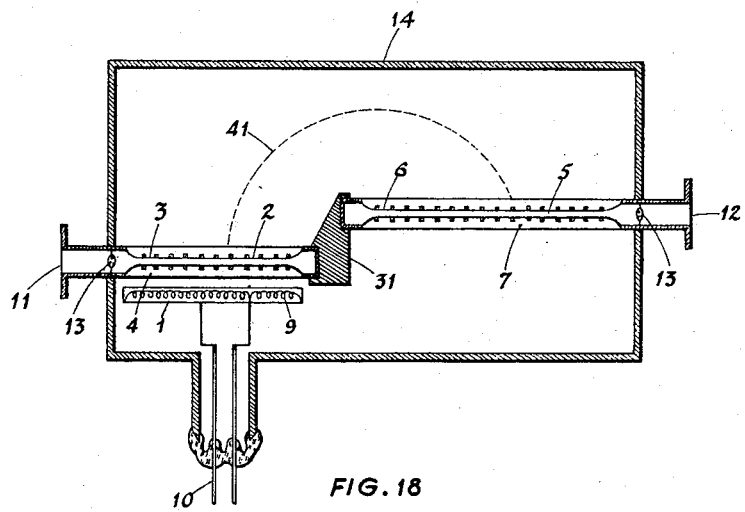
Figs. 18 and 19 are similar views of two amplifiers having non-rectilinear circuits.

To this end electrodes 6 and 7 of the collecting circuit 5 may be disposed as shown in Fig. 18, i.e., in planes parallel to the planes of the electrodes of the modulating circuit 2, but vertically raised away from the plane of the cathode 1.

Figure 19:
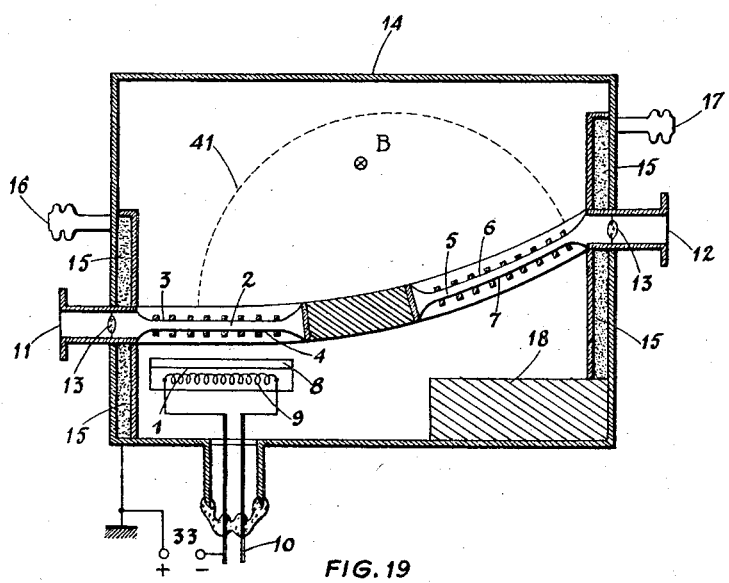

As shown in Fig. 19, it is also possible to give the guide 11—12 an incurved form with the convexity directed towards the cathode 1. Compared with the tube shown in Fig. 5, such tubes have the advantage of requiring weaker magnetic fields, for the same mean transit time of the electrons.

In the tubes shown in Figs. 18 and 19, the trajectories 41 are clearly shorter than a semi-circumference and the electrons in travelling along these trajectories within a given mean transit time require a weaker magnetic field than if the respective arcs were semi-circles. For the same transit time, angular velocity is lower when the angular trajectory is shorter and it is well known that the angular velocity is proportional to the magnetic deflecting field.

Figure 20:
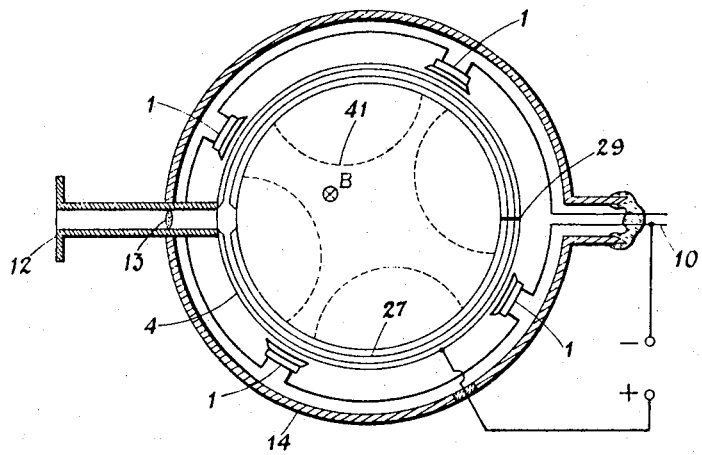
Fig. 20 is a cross sectional view of an oscillator of circular form.

Fig. 20 shows an oscillator derived from the amplifier shown in Fig. 19. The guide 27 is in the form of a circle, each cathode 1 being situated at the apex of a square disposed outside this circle. The structure of the system is symmetrical about an axis perpendicular to the plane of the figure. A guide 12 serves as an ultra-high frequency output. However, in the present case, the guide 27 forming a complete loop, a standing ultra-high frequency field will be induced more easily than a travelling field. A short circuit 29 fixes the position of a voltage node in the guide and hence the position of the nodes and anti-nodes of the standing field produced in this guide and, in consequence, the positions of the cathodes and of the grids. This oscillator permits the magnet necessary for its operation to be smaller.

Figure 23:
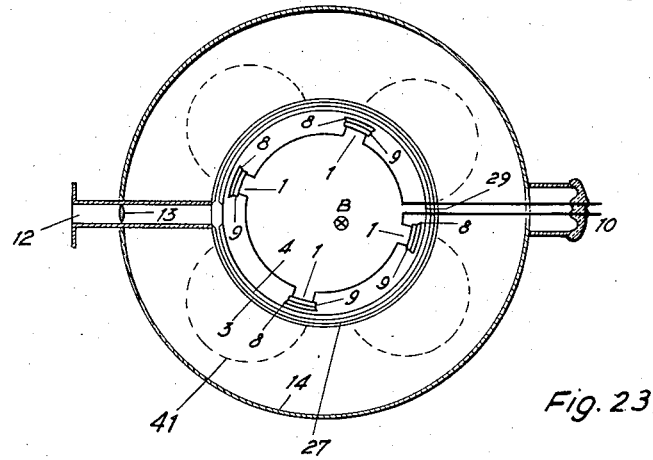
Figs. 23 and 24 are similar views of two subsequent embodiments of oscillators of circular form.
Figure 21:
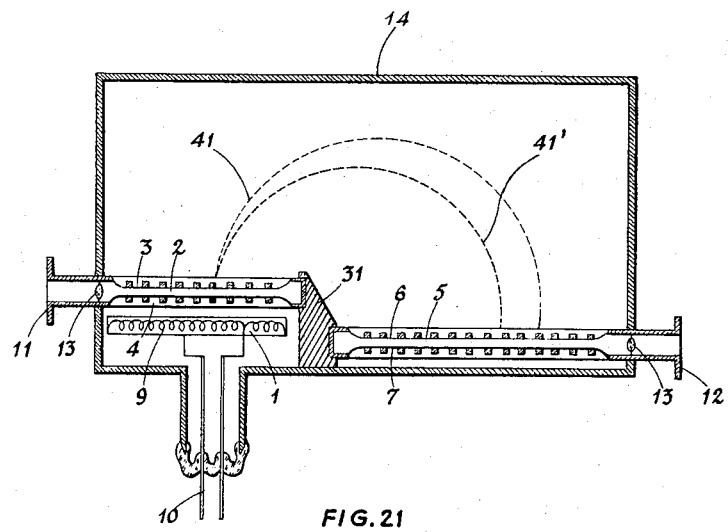
Figs. 21 and 22 are views of two subsequent embodiments of amplifiers having non-rectilinear circuits.
Figure 22:
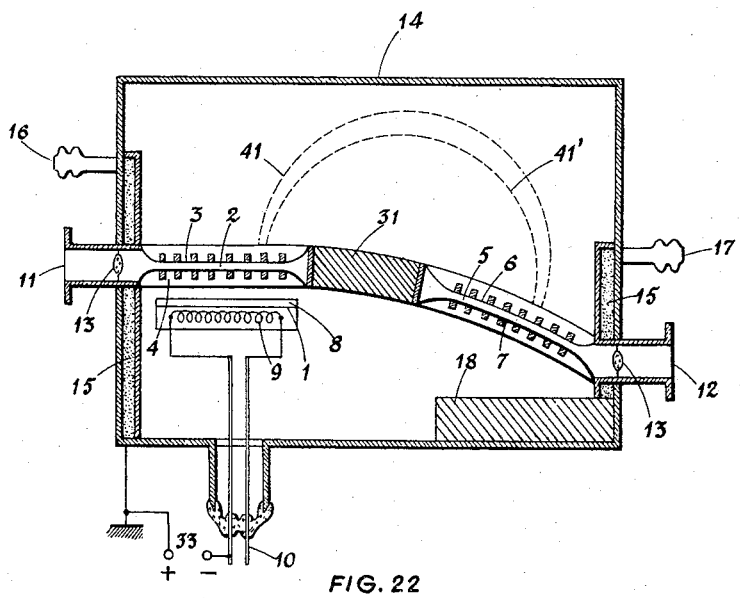

Instead of making the electron trajectories smaller than half a circle, it is also possible, as shown in Figs. 21, 22 and 23, to keep these trajectories substantially equal for all the electrons, in spite of the fact that, as mentioned above, the respective angles of incidence of these trajectories on the electrodes 2 differ from each other.

The tubes shown in Figs. 21 and 22 are respectively analogous to those in Figs. 18 and 19, but in Fig. 21, the circuit 5 is lowered with respect to the circuit 2 instead of being raised. In Fig. 22, the guide 11—12 is incurved, its concave side facing the cathode.

In Fig. 23, the cathodes are placed at the corners of a square within the circle 27.

Owing to the vertically-staggered arrangement of the circuits 2 and 5, the electron trajectories—if the electrons were to enter the drift space with a direction perpendicular to the electrode 3—would be longer than semi-circles. This would result, neglecting the distance between the electrodes 1 and 4, in a modulation of the transit time.

It may be shown that this modulation of the transit time may be compensated by the effect of modulation of the transit time due to the distance between the electrodes, for a convenient value of the accelerating field V and the deviating field B. In other words, if the values V and B are suitably chosen, the electron trajectories are as shown in Figs. 21 through 23 again semi-circles, the latter being no longer normal to the electrodes 3 and 4. The modulation of the transit time is thus eliminated; the modulation of the beam is therefore effected in conditions similar to those prevailing in the tube shown in Fig. 5.

Figure 24:
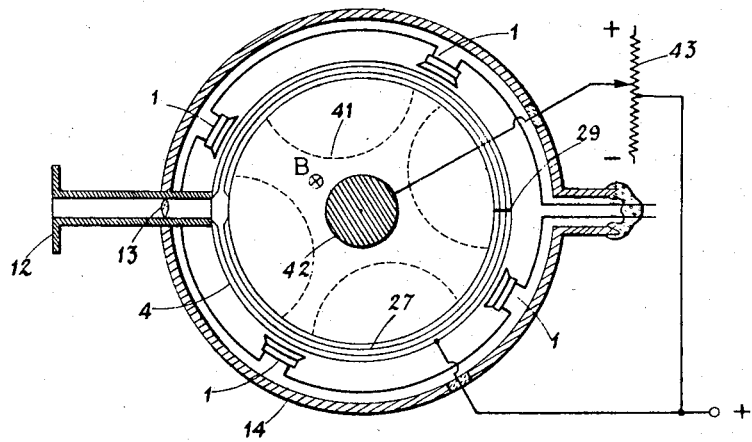

Fig. 24 shows an oscillator which is similar to that shown in Fig. 20, but which comprises an additional cylindrical electrode 42 insulated from the other electrodes of the tube.

This electrode is brought to an adjustable potential which is somewhat higher than that of the electrode 27, by means of the potentiometer 43 and a source 44, whose terminals are respectively connected to the ends of the potentiometer 43. Thus there is obtained in the drift space 42—27 an electrostatic radial field whose lines of force are oriented, according to the setting of this potentiometer, in the direction 27—42 or 42—27. If they are in the direction 42—27 (the potential of the electrode 42 being greater than that of the guide 27) the electron trajectories 41 are no longer arcs of circles so that the electrons approach the electrode 42. The transit time is therefore increased.

Theory and practice show that, by suitably adjusting the potentiometer 43, the transit times of the electrons may be made independent of their initial velocity in the space and operation is as though the trajectories were semi-circles.

Similarly, if the direction of the lines of force is 27—42, the electron trajectories recede from the electrode 42 and are shortened. The transit times are reduced and—by means of a suitable adjustment—it is possible to obtain the optimum values of the transit time indicated above.

Similar results may be obtained by imparting to the lines of force of the magnetic field in the drift space a suitable pattern instead of using a uniform field as in the foregoing examples.

To this end, polar elements 32 may be used which are convex (Fig. 25) or concave (Fig. 26) or annular (Fig. 27), the result obtained with annular elements being the same as that obtained with the elements shown in Fig. 24. All these elements may be used with a cylindrical tube 14 such as for example those shown in Figs. 20, 23 or 24. The axis of the cylinder is indicated at AA'. In the case of tubes having a rectilinear structure, the polar elements may have an incurved shape such as those in Fig. 28 or 29, which shows the system in the same way as Fig. 6. The cathode is assumed located at the base of the figure. The distance between the polar elements increases and the magnetic field decreases when approaching the cathode in Fig. 28 and receding from the cathode in Fig. 29.

If it is desired to reduce the mean transit time of the electrons, for example so as to bring it to its optimum value, it is necessary to subject the electrons in the drift space to a magnetic field which is the stronger as the electrons are further from the cathode. The effect of such a magnetic field is to accentuate the mean curvature of and hence shorten the trajectories.

Conversely, if it is so desired to lengthen the electron trajectories so as to compensate various factors affecting the transit time and hence render them independent of the initial velocity of the electrons in the drift space, there is created in the drift space a field which is such that the electrons are subjected to a field whose intensity decreases with recession of the electrons from the cathode. The effect of this field is to decrease the mean curvature of and hence lengthen the trajectories.

Figures 25, 26:
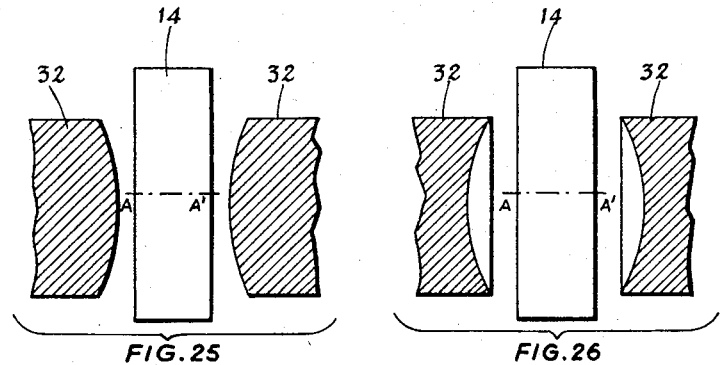
Figs. 25 to 29 are side elevation views of five variants of magnets suitable in the tubes according to the invention.
Figure 27:
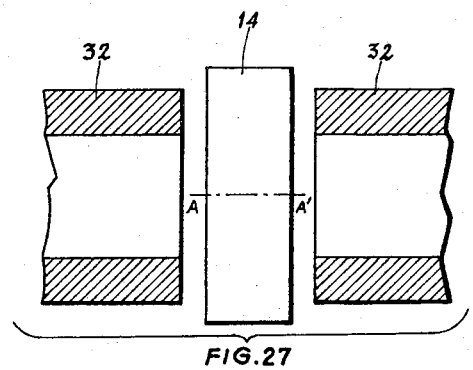

In the first case, the magnets shown in Fig. 25 may be used with the tubes shown in Fig. 20 or 24, or the magnets shown in Fig. 26 or 27 used with the tube shown in Fig. 23. The magnets shown in Fig. 28 would be used with the tube shown in Fig. 5.

Figures 28, 29:
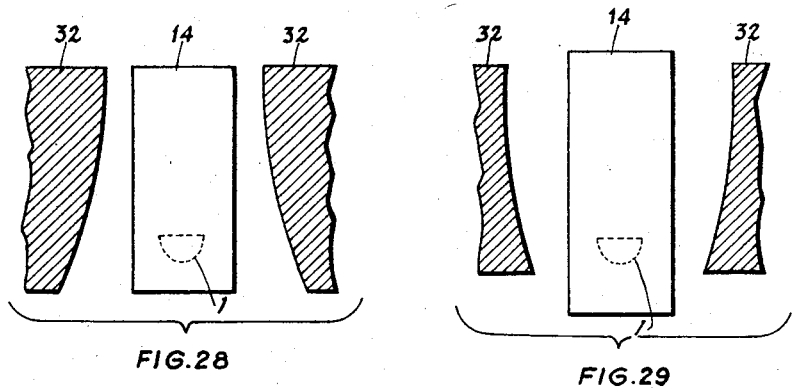

In the second case, the polar elements shown in Fig. 25 are used with the tube shown in Fig. 23 and the elements shown in Figs. 26 and 27 with the tubes shown in Fig. 20 or 24 and those shown in Fig. 29 with the tubes shown in Fig. 19.

Figure 30:
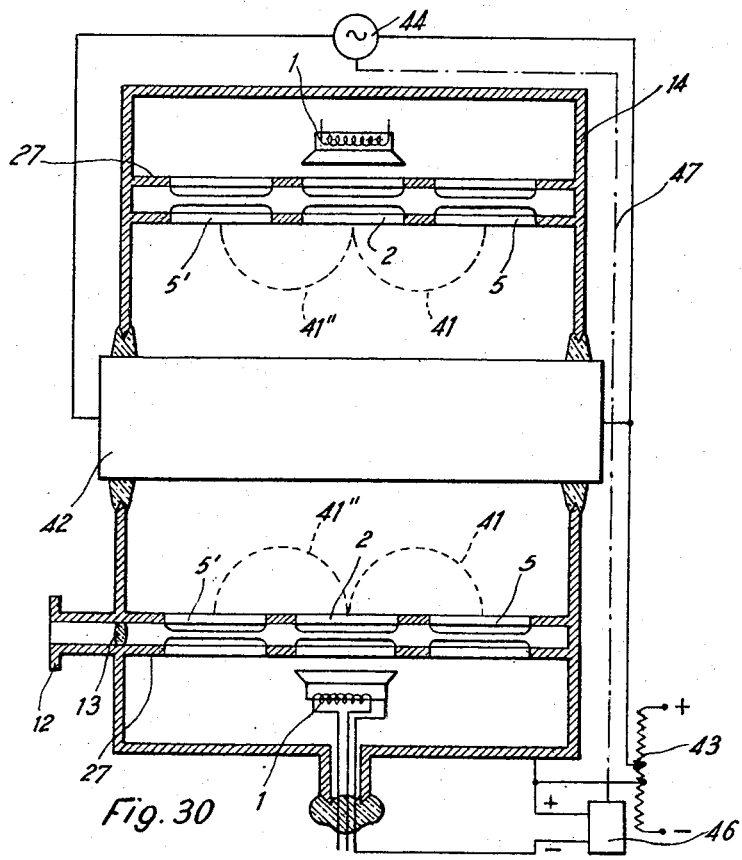
Figs. 30 and 31 are axial and transverse sectional views, respectively, of an oscillator of circular form operating with a non-uniform magnetic field due to the circulation of current in an axial rod.
Figure 31:
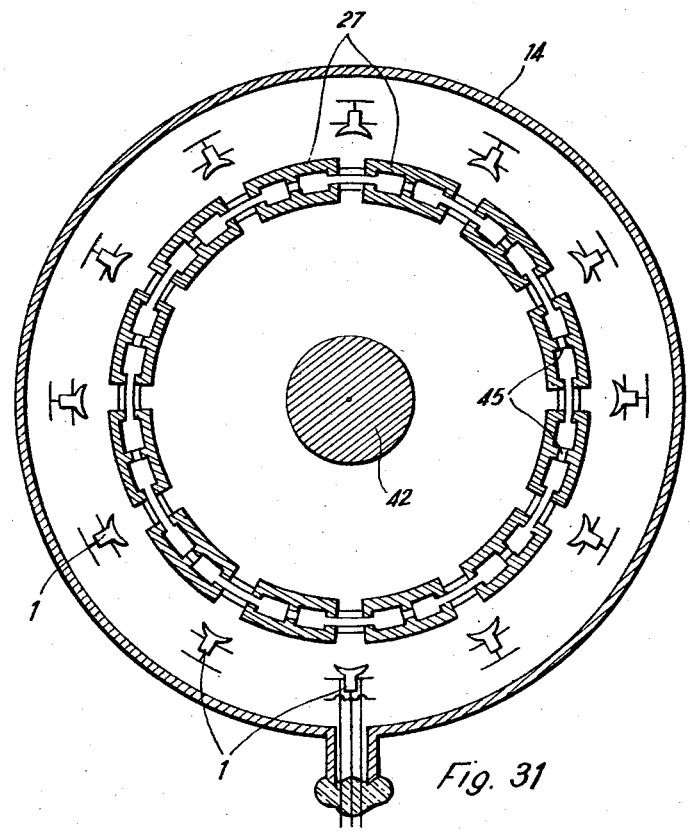

Figs. 30 and 31 are axial sectional and cross-sectional views respectively of another embodiment of an oscillator tube in which the electrostatic and magnetic fields in the drift space are non-uniform, the two above-mentioned effects being combined.

The metal cylindrical envelope 14 contains, axially disposed therein, and insulated therefrom, a metal rod 42. The latter is connected between the terminals of a source of low voltage alternating energy 44 and, furthermore, to a tap of a potentiometer 43 by means of which it is possible to bring the rod to a positive or negative potential relative to the envelope 14. The current created in the rod by the source 44 sets up around the latter an alternating magnetic field whose lines of force are coaxial with the tube, the intensity of the field decreasing with recession from the rod. The positive, or negative, potential applied to the rod results in the creation in the drift space of a radial electric field similar to that shown in Fig. 24.

Further, the cathodes 1 are disposed at the apices of a regular polygon which is coaxial with the tube and is disposed in the median plane of the latter. Guides 27 are disposed on a cylinder coaxial with the envelope 14 and extend in a direction parallel to the generatrices of this cylinder. They are connected to the envelope 14 so as to be brought to the same potential as the latter. Each guide is disposed opposite the corresponding cathode. These guides are disposed side by side and coupled together by apertures 45. One of the guides is provided with an output 12 the passage through the envelope being closed by an insulating window 13. Each guide comprises a modulating circuit 2 and two collector circuits 5, 5' disposed on either side of the modulating circuit; these circuits are, for example, of the type shown in Fig. 7. The electrons from the cathodes 1 pass through the circuits 2 and, under the action of the non-uniform alternating magnetic field, describe trajectories attaining the collector circuit 5 or the circuit 5', according to the alternations. The shape of these trajectories is also affected by the adjustable radial electric field; the cathodes 1 are unblocked by the pulses of the negative potential relative to the potentials of the guides 27. These pulses are applied by a source 46 which is synchronized with the source 44 by means known per se and generally indicated by the dot-dash line 47. The source 46 produces a pulse for each positive or negative peak of the voltage furnished by the source 44. The electrons therefore follow alternately the trajectories 41 or 41". In both cases, each guide is the centre of an ultra-high frequency field, as was explained in the course of the description with reference to the Figs. 5 to 7. Owing to coupling by means of the apertures 45, the ultra-high frequency fields of all the guides are in phase and the energy may be provided through a single output 12.

From the foregoing description it will appear that the basic concept of this invention is applicable on the one hand to microwave electron tubes utilizing either a single pair of microwave circuits corresponding to the circuits 2 and 5 of Figure 1, or, on the other hand, although at least one pair of such circuits is essential, a plurality of intercoupled pairs of circuits may be utilized in the manner illustrated in connection with Figures 15, 20, 23, 24, 30 and 31.

In Figures 15, 20, 23 and 24, the respective pairs of circuits are arranged end-to-end and intercoupled in the manner defined hereinbefore. In Figures 30 and 31, not only are the pairs of circuits 2, 5 and 2, 5' connected end-to-end, but these pairs are also arranged circumferentially side-by-side, as is obvious from the axial view of Figure 31, the first circuits 2 forming an annular ring and the second and third circuits 5 and 5', respectively, also forming annular rings on opposite sides of the circuits 2, each of these annular arrangements being coaxial with respect to the axis of the conducting rod 42 and axially spaced therealong.

While the device of Figure 15 is essentially an amplifier utilizing a traveling wave modulating field, it nevertheless includes a plurality of pairs of intercoupled microwave circuits, the respective pairs being indicated by the dotted beam trajectories connecting the first and second circiuts of each pair.

This application is a division of my application Serial No. 506,317, filed May 5, 1955, now U.S. Patent No. 2,938,139.

What I claim is:

1. A microwave electron tube comprising within an evacuated envelope a plurality of operatively intercoupled pairs of microwave circuits, each said pair of circuits comprising a first circuit and a second circuit extending in a predetermined direction, electron emissive means positioned along each said first circuit for emitting a sheet-like electron beam in coupled relationship with said first circuit, means for feeding microwave energy to each said first circuit to provide amplitude differences of an ultra high frequency field at different points along each said first circuit for simultaneously velocity modulating electrons in the respective beams at said different points in accordance with the amplitude of the ultra high frequency field at the respective points, means for establishing within said envelope a magnetic field having lines of force perpendicular to said direction and to each of said beams for directing the electrons of said beams along curved trajectories whereby, due to combined action of longitudinal modulation of said first circuit and of said magnetic field, the longitudinal modulation of each beam is transformed into transverse modulation thereof, the second microwave circuit of each pair extending across the trajectories of beam electrons from the respective first circuit in coupled relationship with said beam, each said second circuit being of sufficient length and so disposed as to be acted upon by different densities of the electron beam transversely of the latter and along said second circuit, said different densities being representative of the high frequency field in a respective first circuit, thereby to induce a microwave field within each said second circuit and coupling means to said induced fields for utilizing the energy thereof.

2. A microwave electron tube according to claim 1, wherein said coupling means includes means for coupling together the microwave fields of said first and second circuits and means for coupling an external load to one of said circuits.

3. A microwave electron tube according to claim 1, wherein said coupling means includes means for coupling the induced microwave field of one of said second circuits to one of said first circuits.

4. A microwave electron tube according to claim 1, wherein said pairs of microwave circuits are arranged side by side.

5. A microwave electron tube according to claim 1, wherein said pairs of microwave circuits are arranged end to end.

6. A microwave electron tube according to claim 1, wherein said electron emissive means are spaced angularly about an axis of the tube at stations corresponding to apices of a regular polygon.

7. A microwave electron tube according to claim 6, wherein the lines of force of said magnetic field generally circle said axis in planes substantially perpendicular thereto.

8. A microwave electron tube according to claim 6, wherein said magnetic field extends generally parallel to said axis.

9. A microwave electron tube according to claim 1, wherein said pairs of microwave circuits together define a generally circular arrangement.

10. A microwave electron tube according to claim 9, including means for mutually coupling at least some of said circuits to each other circumferentially of said circular arrangement.

11. A microwave electron tube according to claim 9, wherein said first circuits are arranged in one circle and said second circuits are arranged in another circle, said circles being coaxial and axially spaced along the common axis.

12. A microwave electron tube according to claim 11, wherein the predetermined directions in which said circuits extend is generally parallel to said axis.

13. A microwave electron tube according to claim 9, wherein the predetermined direction in which said circuits extend is circular corresponding generally to said circular arrangement.

14. A microwave electron tube according to claim 13, wherein said circuits are parts of a wave guide forming a substantially complete loop, and further including means within said guide fixing position of the nodes and anti-nodes of a standing ultra high frequency field in said guide.

15. A microwave electron tube according to claim 1, including means for uniformally varying the electron trajectories at each of said pairs of microwave circuits.

16. A microwave electron tube according to claim 15, wherein said means includes conducting means similarly positioned with respect to the first and second circuits of each said pair of circuits.

17. A microwave electron tube according to claim 16, wherein said conducting means provides modification of the electric field between said conducting means and the respective pairs of microwave circuits.

18. A microwave electron tube according to claim 16, wherein said conducting means carries an electric current which determines the strength of said magnetic field.

19. A microwave electron tube according to claim 1, wherein there is further included for each pair of microwave circuits a third microwave circuit, said second and third microwave circuits for each pair being disposed on opposite sides of said first circuit, and means for reversing the direction of said magnetic field whereby when said magnetic field assumes one direction the trajectories of said beam electrons are from said first circuit to said second circuit and when said magnetic field assumes the opposite direction the trajectories of said beam electrons are from first circuit to said third circuit to similarly induce a microwave field within said third circuit, and coupling means to said field in said third crcuit for utilizing the energy thereof.

20. A microwave electron tube according to claim 19, including a conductor symmetrically arranged relative each group of first, second and third circuits, and means for causing current flow in opposite directions in said conductor to reverse the direction of said magnetic field.

21. A microwave electron tube for initially generating oscillatory microwave energy having a predetermined frequency, said tube comprising within an evacuated envelope at least one pair of microwave circuits comprising a first circuit and a second circuit extending in one predetermined direction, electron emissive means positioned along said first circuit for emitting a sheet-like electron beam in coupled relationship with said first circuit, means for feeding microwave energy to said first circuit to provide amplitude differences of an ultra high frequency field at different points along said first circuit for simultaneously velocity modulating electrons in said beam at said different points in accordance with the amplitude of the ultra high frequency field at the respective points, means for establishing within said envelope a magnetic field having lines of force perpendicular to said direction and to said beam for directing the electrons of said beam along curved trajectories whereby, due to combined action of longitudinal modulation of said first circuit and of said magneic field, the longitudinal modulation of said beam is transformed into transverse modulation thereof, said second microwave circuit extending across said trajectories in coupled relationship with said beam and being so constructed and arranged as to be tuned to oscillatory energy of said predetermined frequency, said second circuit being of such construction and so disposed as to be acted upon by different densities of the electron beam at different points transversely of the latter and along said second circuit, said different densities being representative of the high frequency field in said first circuit, whereby an oscillatory microwave field of said predetermined frequency is induced within said second circuit, means for energizing said tube from external source means providing electrical energy other than of said predetermined frequency, and coupling means to said field for abstracting and utilizing microwave energy of said predetermined frequency therefrom.

22. A microwave electron tube for generating self-sustained oscillations comprising within an evacuated envelope at least one pair of microwave circuits comprising a first circuit and a second circuit extending in a predetermined direction, electron emissive means positioned along said first circuit for emitting a sheet-like electron beam in coupled relationship therewith, means for feeding microwave energy to said first circuit to provide amplitude differences of an ultra high frequency field at different points along said first circuit for simultaneously velocity modulating electrons in said beam differently at said different points in accordance with the amplitude of the ultra high frequency field at the respective points, means for establishing within said envelope a magnetic field having lines of force perpendicular to said direction and to said beam for directing the electrons of said beam along curved trajectories whereby, due to combined action of longitudinal modulation of said first circuit and of said magnetic field, the longitudinal modulation of said beam is transformed into transverse modulation thereof, said second microwave circuit extending across trajectories in coupled relationship with said beam, said second circuit being of sufficient length and so disposed as to be acted upon by different densities of the electron beam transversely of the latter and along said second circuit, said different densities being representative of the high frequency field in said first circuit, thereby to induce a microwave field within said second circuit, said feeding means including means for mutually coupling said first and second circuits other than via the electron beam, and coupling means for abstracting oscillatory microwave energy from said tube for external utilization thereof.

23. An electron tube according to claim 22, wherein said first and second circuits are portions of a single wave guide.

24. An electron tube according to claim 23, including means within said guide for controlling the feedback from said second circuit to said first circuit.

25. An electron tube according to claim 24, wherein said feedback controlling means is adjustable.

26. An electron tube according to claim 22, wherein said first and second circuits are resonant cavities.

27. An electron tube according to claim 26, wherein said resonant cavities are coupled by a coaxial line portion.

28. An electron tube according to claim 22, wherein said circuits are curved to present a generally convex surface facing the area of said electron trajectories.

29. An electron tube according to claim 22, wherein said circuits are generally curved to present concave surfaces facing the area of electron trajectories.

30. A tube according to claim 22, wherein said means for establishing said magnetic field provides a field which is non-uniform through the area traversed by said electron beam trajectories.

31. An electron tube according to claim 22, further comprising means for generating with said envelope an electrostatic field having lines of force substantially perpendicular to said direction for modifying the beam electron trajectories.

References Cited in the file of this patent

UNITED STATES PATENTS

| | | |
|---|---|---|
| 2,272,165 | Varian et al. | Feb. 3, 1942 |
| 2,469,964 | Hartman | May 10, 1949 |
| 2,735,034 | McArthur | Feb. 14, 1956 |